Nov. 28, 1961 E. P. HURD 3,010,764
WHEEL COVER
Filed May 18, 1956 3 Sheets-Sheet 1
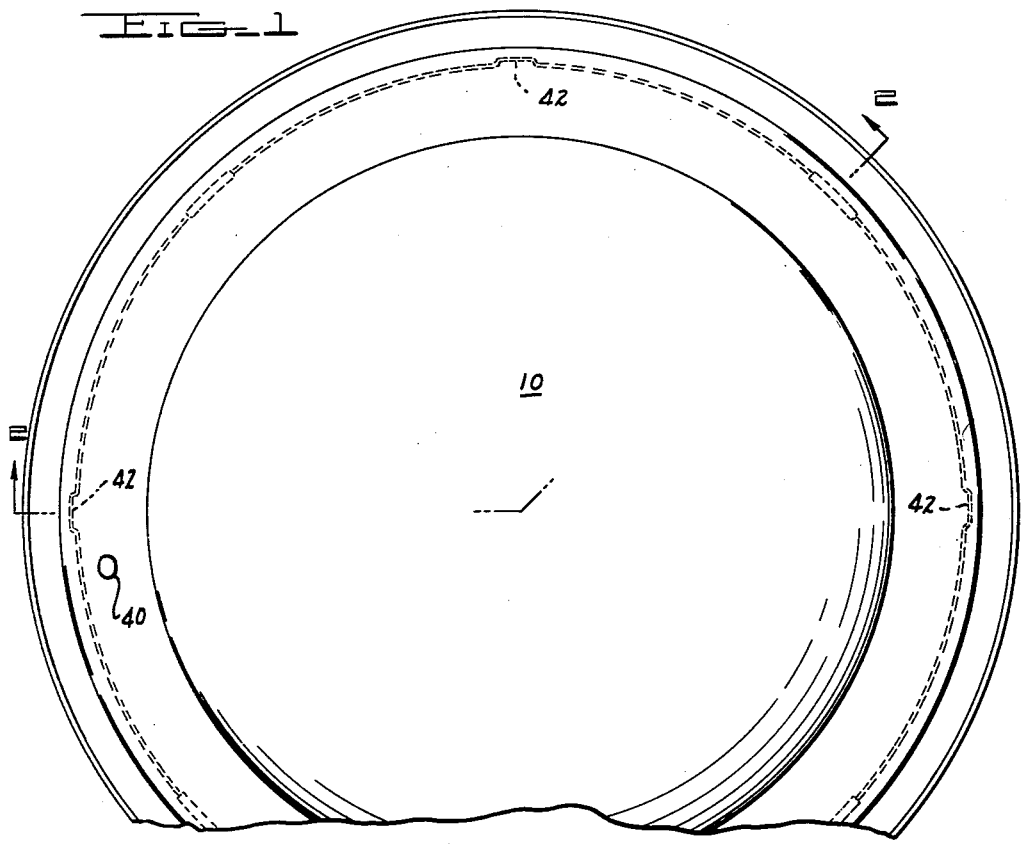
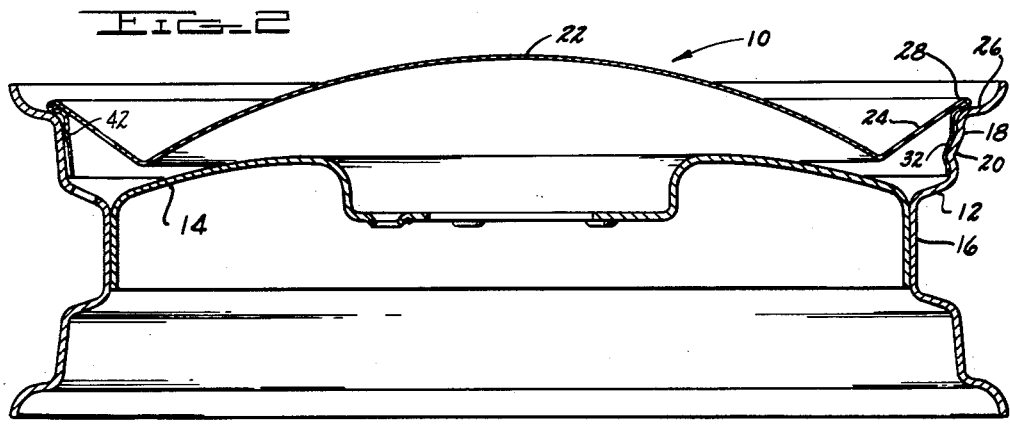
INVENTOR
EDWIN P. HURD
BY SMITH, OLSEN, LEWIS & McRAE
ATTORNEYS

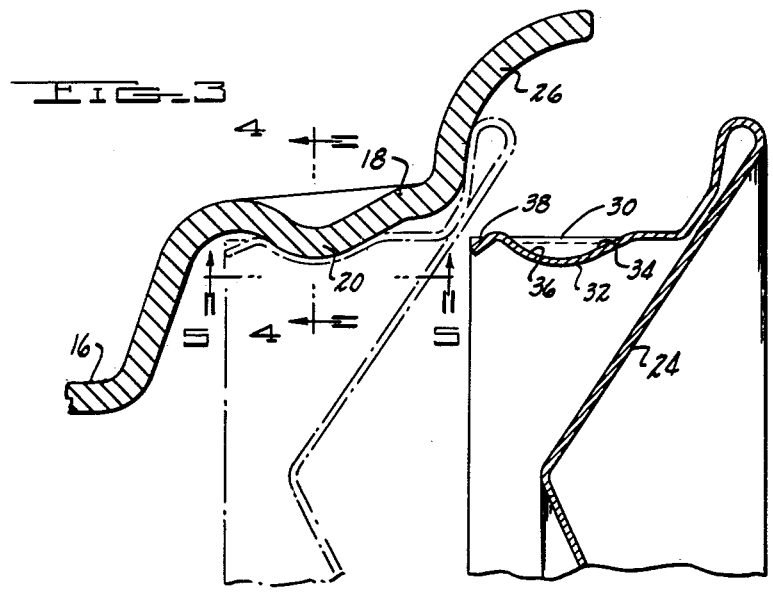
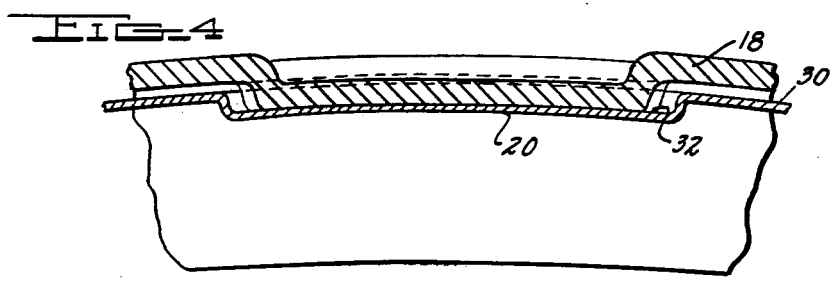
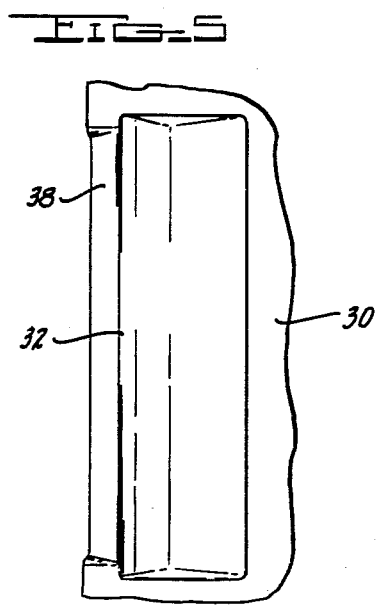

Nov. 28, 1961 E. P. HURD 3,010,764
WHEEL COVER
Filed May 18, 1956 3 Sheets-Sheet 3
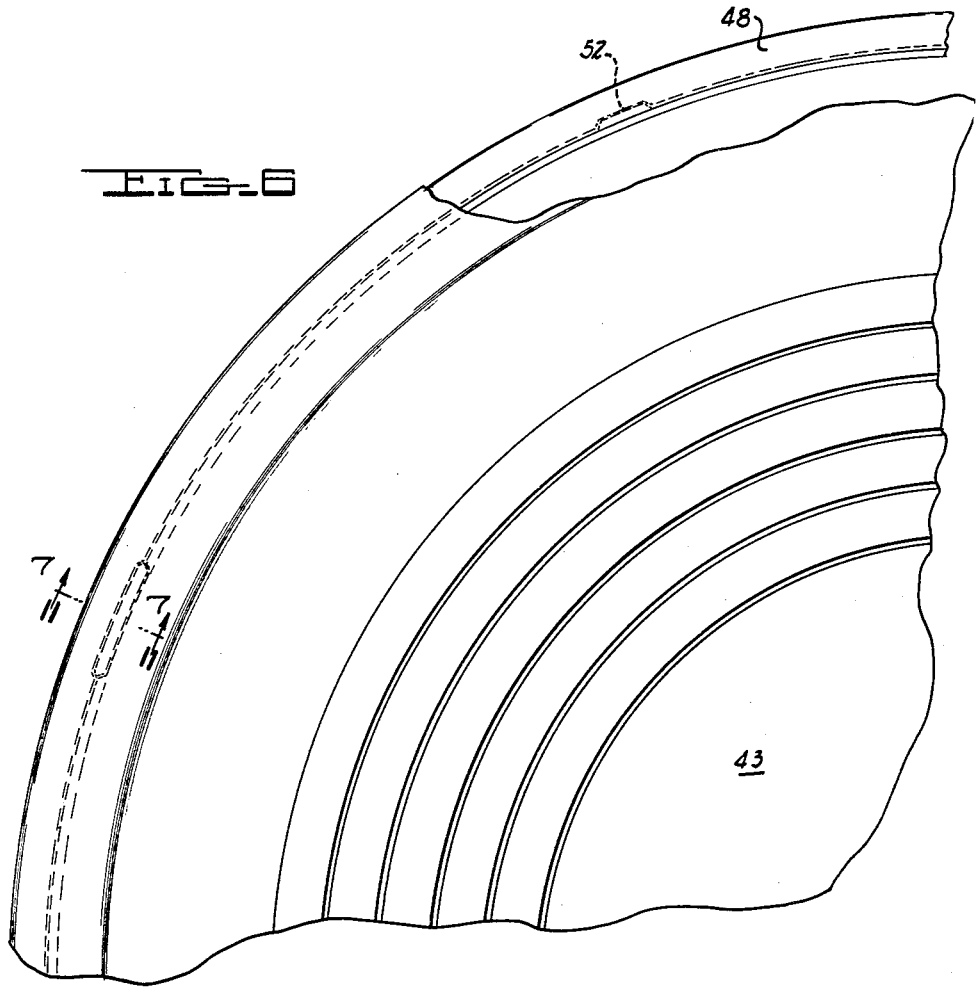
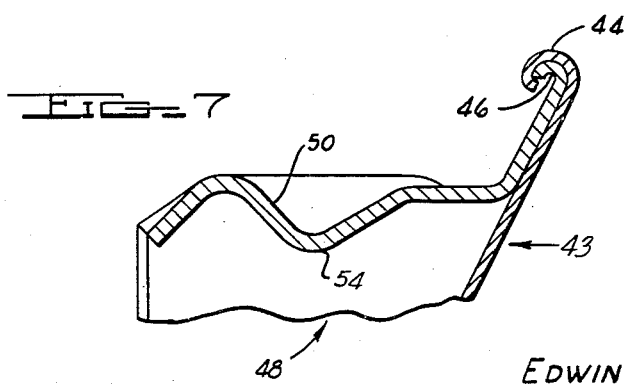
INVENTOR.
EDWIN P. HURD
BY
SMITH, OLSEN, LEWIS & M<sup>c</sup>RAE
ATTORNEYS 3,010,764
WHEEL COVER
Edwin P. Hurd, Detroit, Mich., assignor to Hurd Lock & Manufacturing Company, Detroit, Mich., a corporation of Michigan
Filed May 18, 1956, Ser. No. 585,840
16 Claims. (Cl. 301—37)

The present invention relates to an improved wheel structure, and more particularly to a novel means for mounting and retaining a full wheel cover on an automobile wheel. This is a continuation-in-part of my prior application, Serial No. 472,551, filed December 2, 1954, now abandoned.

It is an object of the present invention to provide an improved wheel and cover assembly having novel retaining means for maintaining the cover over the outer side of the wheel to conceal the same.

It is another object of the present invention to provide an improved wheel and cover assembly which is characterized by the simple construction employed for retaining the cover on the wheel, such construction permitting a quick and easy assembly of the parts and permitting economical production of the cover.

It is still another object of the present invention to provide an improved wheel and cover assembly of the foregoing character, said assembly being constructed and arranged so that the cover retaining means are not subjected to vertical road shocks, such means being relieved of this duty so that they can more effectively retain the cover in place and prevent relative rotation of the cover with respect to the wheel.

It is still another object of the present invention to provide a wheel cover having a novel construction so that the cover is self-piloting when being installed on a wheel thereby increasing the ease with which it can be installed.

Still another object of the present invention is to provide a wheel cover having a simple construction for preventing rotative movement of the cover relative to the wheel rim.

Another object of the present invention is to provide a unique retaining means for the cover which will effectively hold the cover on the wheel rim irrespective of small variations in the size of the wheel rim.

Other objects of this invention will appear in the following description and appended claims, reference being had to the accompanying drawings forming a part of this specification wherein like reference characters designate corresponding parts in the several views.

In the drawings:

FIG. 1 is a fragmentary side elevational view of a wheel structure embodying the features of the present invention;

FIG. 2 is a section taken on the line 2—2 of FIG. 1;

FIG. 3 is an enlarged fragmentary sectional view showing the retaining portion of the cover in two stages of assembly;

FIG. 4 is a fragmentary section taken on the line 4—4 of FIG. 3;

FIG. 5 is a fragmentary view as seen when looking in the direction of the arrows on line 5—5 of FIG. 3;

FIG. 6 is a fragmentary view of a modified form of the present invention; and

FIG. 7 is an enlarged fragmentary section taken on the line 7—7 of FIG. 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the embodiment illustrated in FIGS. 1 to 5 will be given. The full wheel cover 10 is adapted to be applied to the outer side of a vehicle wheel including a multi-flange drop center type rim 12 such as is in common use. The wheel body 14 is attached in suitable manner as by spot welding or riveting to the base flange 16 of the tire rim 12. In addition, the intermediate axial flange 18 has a plurality of radially inwardly projecting protuberances or bumps 20. These bumps may be of any suitable number, and in the disclosed embodiment of the invention, four are used. They are preferably circumferentially equidistantly spaced and have their innermost points arranged in a circle.

In addition, the bumps are of equal circumferential dimensions and have axially extending cam surfaces. These bumps are used in the detachable retention of the novel cover 10.

The cover 10 is illustrated in the form of a dished metallic stamping made from thin sheet metal and has a central crown or hub portion 22 for covering the wheel body 14. The crown portion 22 extends axially inwardly and radially outwardly toward the junction of the wheel body 14 and the rim 12, and an integral annular portion 24 then flares axially outwardly to an overlapping position with respect to the outer radial flange 26 of the rim 12.

The cover margin is inwardly turned as at 28 so that the underturned portion is adjacent the inner side of the annular portion 24. The stamping forming the cover then terminates in an axial flange 30 which extends generally inwardly in telescoping relation with respect to the intermediate flange 18 of the rim.

The axial flange 30 is continuous circumferentially and has a plurality of indents 32 which are equal in number and are spaced so as to correspond to the spacing of the bumps 20 in the tire rim. The indents 32 are longer than the bumps 20 so that the latter can fit into the former when the cover is pressed onto the wheel with flange 30 telescoped into the intermediate flange 18.

As can be seen in FIG. 3, the indent 32 has a surface 34 which slopes axially and radially inwardly followed by another surface 36 which slopes axially inwardly but radially outwardly. The indent 32 then has a chamfered edge 38 which serves to allow easy entrance and indexing of the cover so that the bumps 20 will always enter the indents 32. To aid in this locating operation, the cover has an aperture 40 for receiving a valve stem (not shown). It is also to be noted that the circumferential length of the chamfered edge 38 is shorter than that of the indent so that when the bumps 20 pass through the chamfered edges 38 they will always fall into the indents 32.

The wheel cover construction described above is fully disclosed in my prior application, Serial No. 472,551, filed December 2, 1954, now abandoned. Such a cover performs very satisfactorily as long as the wheel rim is made to the correct dimensions. However, it is found that proper tolerances are not always maintained when manufacturing wheel rims, with the result that the cover may vibrate causing undesirable noises. In order to correct for such failures in not making the rims uniformly the same size, auxiliary lumps or projections 42 are formed on the radially outer side of the flange 30. The lumps or projections 42 are equal in number to the indents 32 and are evenly spaced therebetween. Thus, in the embodiment shown in FIGS. 1–5, four such lumps or projections 42 are employed.

The projections 42 serve as contact points which together with indents 32 engage the intermediate flange 18 of rim 12. The circle containing the outer contacting surfaces of projections 42 is slightly larger than the inner surface of intermediate flange 18. This causes the flange 30 to be squeezed out of its true circular shape toward what may be considered an eight sided figure. Naturally the distortion in this direction is only slight, but it will tend to maintain the flange 30 in tight contact with the intermediate flange 18 at all eight contact points. If a rim is out of round, or not an accurate one from the standpoint of the inner radius of its intermediate flange, the extent to which the flange 30 will be distorted will change, such change being sufficient to accommodate the inaccuracy. However, within reasonable limits the eight contact points will firmly engage the intermediate flange 18, thereby effecting a tight noise-free retention of the cover on the rim.

In constructing the cover 10, the flange 30 will be formed of metal having resilient properties and its diameter is such that the indents 32 and projections 42 will fit against the intermediate flange 18 and its protuberances or bumps 20 so that flange 30 will absorb all the vertical road shocks thereby relieving the cover retaining indents 32 of this duty. In this manner the indents in cooperation with the projections 42 and turned margin 28 act to hold the cover in place with no vibrations occurring and with no opportunity for the vertical road shocks to dislodge the cover from the wheel. Furthermore, the indents operate more effectively to prevent relative rotation of the cover 10 with respect to rim 12.

The fact that the axial flange 30 is continuous and the indents 32 and projections 42 are formed therein as an integral part has the additional advantage that the flange 30 acts as a spring urging the indents 32 against the wheel bumps 20. By virtue of this construction and arrangement the indents 32 with the cooperation of projections 42 will always maintain uniform holding of bumps 20.

Referring now to FIGS. 6 and 7, a modified form of the invention will be described. In this embodiment the outward appearance of the wheel cover 43 may be the same as that of the cover 10 previously described, or any other ornamental design, such as is shown in FIG. 6, may be employed. Cover 43 differs from cover 10 in that the former is made from two pieces of metal rather than as a one piece sheet metal stamping. Thus, the crown portion terminates at its outer periphery in a rolled, turned or folded edge 44 which retainingly engages or interlocks with a corresponding edge 46 of the annulus 48. In other respects, the annulus 48 is shaped the same as the axial flange 30 of the other embodiment. When cover 43 is mounted on the wheel rim 12 the bump 20 and side flange 26 will be clamped between the surface 50 and the rolled edge 44 in the same manner that the surface 36 and the turned margin 28 hold cover 10 in place on rim 12. This modification also employs projections 52 for the same purpose as projections 42 were employed in the embodiment shown in FIGS. 1 to 5.

Certain advantages are obtained by manufacturing the cover in two pieces as shown in FIGS. 6 and 7. The annulus 48 can then be made of the cheapest metal that will most effectively hold the cover 43 on the rim, and the crown portion can be made of metal most suitable for providing an attractive ornamental appearance. In addition, the double thickness of metal at the rolled edge is most effective in providing a firm holding action between such edge and the surface 50 of the indentations 54.

Having thus described my invention, I claim:

1. In a wheel structure, a wheel having a body part and a drop center type rim wherein an axial flange of the latter has a plurality of radially inwardly projecting bumps which are circumferentially spaced, a cover for disposition over the outer side of the wheel comprising a circular disk adapted to conceal the body part and the radially inner portions of the rim, said disk terminating at its outer periphery in a rearwardly turned edge, and an annulus of cylindrical shape with its axially outer end flared radially outwardly and terminating in an edge folded into the outer periphery of said disk, said annulus having a plurality of circumferentially spaced indents adapted to seat on said bumps, and radially outwardly extending projections spaced circumferentially from said indents for engaging said axial flange.

2. In a wheel structure, a wheel having a body part and a drop center type rim wherein an axial flange of the latter has a plurality of radially inwardly projecting bumps which are circumferentially spaced, a cover for disposition over the outer side of said wheel comprising a circular disk adapted to conceal the body part and the radially inner portions of the rim, said disk terminating at its outer periphery in a turned edge, and an annulus of cylindrical shape with its axially outer end flared radially outwardly and terminating in an edge folded into the outer periphery of said disk, said annulus having a plurality of circumferentially spaced indents adapted to seat on said bumps, radially inwardly chamfered edge portions associated with said indents for guiding the bumps into said indents, and radially outwardly extending projections spaced circumferentially intermediate said indents for contacting said intermediate axial flange.

3. In combination, a wheel having a body part and a drop center type rim wherein the intermediate axial flange has a plurality of radially inwardly projecting bumps which are circumferentially spaced, and a cover for disposition over the outer side of said wheel, said cover having an axially inwardly projecting continuous flange telescoped into the intermediate axial flange, said continuous flange having a plurality of radially inwardly depressed indents circumferentially spaced which fit over the bumps in said rim, said continuous flange also having a plurality of outward projecting lumps contacting said intermediate axial flange at points circumferentially between said inwardly projecting bumps, the contacting surfaces of said lumps being in a circle slightly larger than said intermediate flange so that the continuous flange of the cover is distorted out of round when the cover is mounted on the wheel thereby urging the indents more tightly against the bumps in said rim.

4. In combination, a wheel and cover as recited in claim 3 wherein said cover is an integral one-piece construction.

5. In combination, a wheel cover as recited in claim 3 wherein said cover is a two-piece construction, said inwardly projecting continuous flange being a part of an annulus which is joined to the front disk part of the cover by a turned edge.

6. In a wheel structure a wheel having a body part and a drop center type rim wherein an axial flange has a plurality of radially inwardly projecting bumps which are circumferentially spaced, a cover for disposition over the outer side of said wheel and having an axially inwardly projecting resilient continuous flange of slightly less diameter than said flange and adapted to telescope into the axial flange, said continuous flange having a plurality of circumferentially spaced indents adapted to seat on said bumps for retaining said cover against axial or rotational movement with respect to said rim, said continuous flange also having a plurality of outwardly projecting lumps located circumferentially intermediate said indents adapted to contact said axial flange, the radially outer portions of said lumps being in a circle slightly greater in diameter than the inner contacted surface of said axial flange so that when the cover is pressed on to said rim the lumps will tend to force the continuous flange out of round thereby urging the indents into a tighter seating relationship on the bumps of said rim.

7. In a wheel structure as recited in claim 6 wherein said cover is an integral one-piece construction.

8. In a wheel structure as recited in claim 6 wherein said cover is a two-piece construction, said inwardly projecting continuous flange being a part of an annulus which is joined to the front disk part of the cover by a folded edge.

9. In combination, a wheel having a drop center type rim wherein the intermediate axial flange has a plurality of radially inwardly projecting bumps which are circumferentially spaced and a side flange axially and radially outward of said intermediate flange, and a cover for disposition over at least a portion of the outer side of said wheel, said cover having an outer peripheral edge seated on said side flange and an axially inwardly projecting continuous flange telescoped into the intermediate axial flange, said continuous flange having a plurality of radially inwardly depressed indents circumferentially spaced which fit over the bumps in said rim and in cooperation with said peripheral edge clampingly engage said rim, said continuous flange also having a plurality of outwardly projecting lumps contacting said intermediate axial flange at points circumferentially between said inwardly projecting bumps, the contacting surfaces of said lumps being in a circle slightly larger than said intermediate flange so that the continuous flange of the cover is distorted out of round when the cover is mounted on the wheel so as to urge the indents radially outwardly effecting a tighter clamping engagement of the rim by the cover.

10. In combination, a wheel having a rim with an axial flange containing a plurality of radially inwardly projecting bumps which are circumferentially spaced, and a cover for disposition over at least a portion of the outer side of said wheel, said cover having an axially inwardly projecting continuous flange telescoped into said axial flange, said continuous flange having a plurality of radially inwardly depressed indents circumferentially spaced to fit over and seat on the bumps in said axial flange, said continuous flange also having a plurality of radially outwardly extending projections contacting said axial flange and being circumferentially spaced and in the plane containing said indents, said projections having their radially outer surfaces in a circle slightly larger than a circle containing the contacted portions of said axial flange, whereby the continuous flange absorbs through said projections vertical shocks transmitted to the cover from the rim and the indents cooperate with the bumps to retain the cover on the wheel and to prevent relative rotation between the cover and the wheel.

11. In combination, a wheel having a rim with a side flange and an axial flange radially and axially inward thereof containing a plurality of radially inwardly projecting bumps which are circumferentially spaced, and a cover for disposition over at least a portion of the outer side of said wheel with a radially outer portion of the cover seated on said side flange, said cover having an axially inwardly projecting continuous flange telescoped into said axial flange, said continuous flange having a plurality of radially inwardly depressed indents circumferentially spaced to fit over and seat on the bumps in said axial flange and in cooperation with said outer portion clampingly engage said rim, said continuous flange also having a plurality of radially outwardly extending projections contacting said axial flange and being circumferentially spaced between said indents and in the plane containing said indents, said projections having their radially outer surfaces in a circle slightly larger than a circle containing the contacted portions of said axial flange, whereby the continuous flange is biased out of round when the cover is mounted on the wheel so as to urge the indents radially outwardly to prevent relative rotation between the wheel and the cover and to effect a tighter clamping of the rim by the indents and the radially outer portion of the cover.

12. In combination, a wheel having a rim with a side flange and an axial flange radially and axially inward thereof containing a plurality of radially inwardly projecting bumps of substantially circumferential length and radial extent and being generally circumferentially aligned, and a cover for disposition at the outer side of the wheel, said cover having an annular portion seated on said side flange and an axially inwardly extending continuous flange portion telescoped into said axial flange, said continuous flange portion having a circumferential series of radially inwardly depressed indents matching said bumps and provided with generally axially outwardly facing substantially straight surfaces of slightly greater circumferential length than said bumps and interengageable therewith for cooperation with said annular portion in retaining the cover on the wheel in press-on, pry-off relation, said indents having at the opposite circumferential sides thereof shoulders that oppose the respective adjacent sides of said bumps for engagement therewith on tendency of turning of the cover on the wheel to retain the cover against such turning and radially inwardly chamfered edge portions associated with said indents for guiding the bumps into said indents, the circumferential lengths of the chamfered edges being less than the circumferential lengths of said indents.

13. In combination, a wheel having a rim with a side flange and an axial flange radially and axially inward thereof containing a plurality of radially inwardly projecting bumps of substantial circumferential length and radial extent and being generally circumferentially aligned, and a cover for disposition at the outer side of the wheel, said cover having an annular portion seated on said side flange and an axially inwardly extending continuous flange portion telescoped into said axial flange, said continuous flange portion having a circumferential series of radially inwardly depressed indents matching said bumps and provided with generally axially outwardly facing substantially straight surfaces of slightly greater circumferential length than said bumps and interengageable therewith for cooperation with said annular portion in retaining the cover on the wheel in press-on, pry-off relation, said indents having at the opposite circumferential sides thereof shoulders that oppose the respective adjacent sides of said bumps for engagement therewith on tendency of turning of the cover on the wheel to retain the cover against such turning, said continuous flange also having a plurality of radially outwardly extending projections spaced circumferentially from said indents, said projections having their radially outer surfaces in a circle slightly larger than a circle containing the contacted portions of said axial flange.

14. In combination, a wheel having a rim with a side flange and an axial flange radially and axially inward thereof containing a plurality of radially inwardly projecting bumps generally circumferentially aligned, and a cover for disposition at the outer side of the wheel, said cover having an annular portion seated on said side flange and an axially inwardly extending continuous flange portion telescoped into said axial flange, said continuous flange portion having a circumferential series of radially inwardly depressed indents matching said bumps and seated thereon for retaining said cover on said rim, said continuous flange portion also having radially inwardly depressed edge portions axially aligned with said indents for guiding the bumps into said indents when the cover is pressed onto the wheel.

15. The combination of claim 14, wherein said depressed edge portions are disposed axially inwardly of said indents and each edge portion has a pair of ends spaced apart in a direction axially of said cover, the circumferential lengths of said depressed edge portions measured at the ends thereof which are closest to said indents being no greater than the circumferentially lengths of said indents.

16. In combination, a wheel having a rim with a side flange and an axial flange radially and axially inward thereof containing a plurality of radially inwardly projecting bumps generally circumferentially aligned, and a cover for disposition at the outer side of the wheel, said cover having an annular portion seated on said side flange and an axially inwardly extending continuous circular portion telescoped into said axial flange, said continuous circular portion having a circumferential series of radially inwardly depressed indents matching said bumps and seated thereon for retaining said cover on said rim, said continuous circular portion also having radially inwardly depressed guide formations disposed axially inward of each of said indents and axially aligned therewith for guiding the bumps into said indents when the cover is pressed onto the wheel.

References Cited in the file of this patent

UNITED STATES PATENTS

| | | |
|---|---|---|
| 2,127,598 | Horn et al. | Aug. 23, 1938 |
| 2,239,366 | Lyon | Apr. 22, 1941 |
| 2,308,616 | Lyon | Jan. 19, 1943 |
| 2,329,921 | Lyon | Sept. 21, 1943 |
| 2,607,632 | Lyon | Aug. 19, 1952 |
| 2,624,640 | Lyon | Jan. 6, 1953 |
| 2,669,487 | Horn | Feb. 16, 1954 |
| 2,675,040 | Raun et al. | Apr. 13, 1954 |
| 2,865,683 | Lyon | Dec. 23, 1958 |